(12) United States Patent
Garcia-Luna-Aceves et al.

(10) Patent No.: US 6,683,865 B1
(45) Date of Patent: Jan. 27, 2004

(54) SYSTEM FOR ROUTING AND SWITCHING IN COMPUTER NETWORKS

(75) Inventors: J. Joaquin Garcia-Luna-Aceves, San Mateo, CA (US); David A. Beyer, Los Altos, CA (US); Thane J. Frivold, Redwood City, CA (US)

(73) Assignee: Nokia Wireless Routers, Inc., Mountain View, CA (US)

( * ) Notice: Subject to any disclaimer, the term of this patent is extended or adjusted under 35 U.S.C. 154(b) by 0 days.

(21) Appl. No.: 09/418,898

(22) Filed: Oct. 15, 1999

(51) Int. Cl.[7] .............................. H04L 12/56; H04J 3/24
(52) U.S. Cl. ...................................... 370/349; 370/401
(58) Field of Search ................... 370/389, 392, 370/395.1, 397, 399, 400, 401, 465, 466, 469, 338, 349

(56) References Cited

U.S. PATENT DOCUMENTS

| | | | |
|---|---|---|---|
| 4,466,060 A | | 8/1984 | Riddle |
| 4,987,536 A | | 1/1991 | Humblet |
| 5,115,433 A | | 5/1992 | Baran et al. |
| 5,233,604 A | | 8/1993 | Ahmadi et al. |
| 5,394,436 A | | 2/1995 | Meier et al. |
| 5,487,064 A | * | 1/1996 | Galand et al. ............... 370/392 |
| 5,548,578 A | * | 8/1996 | Matsune et al. ............ 370/248 |
| 5,572,528 A | * | 11/1996 | Shuen ......................... 370/338 |
| 5,588,121 A | | 12/1996 | Reddin et al. |
| 5,596,719 A | | 1/1997 | Ramakrishnan et al. |
| 5,600,641 A | * | 2/1997 | Duault et al. ............... 370/400 |
| 5,602,841 A | * | 2/1997 | Lebizay et al. ............. 370/413 |
| 5,608,721 A | | 3/1997 | Natarajan et al. |
| 5,633,866 A | | 5/1997 | Callon |
| 5,638,371 A | | 6/1997 | Raychaudhuri et al. |
| 5,721,819 A | | 2/1998 | Galles et al. |
| 5,805,593 A | * | 9/1998 | Busche ........................ 370/238 |
| 5,854,899 A | * | 12/1998 | Callon et al. ............... 370/235 |
| 5,881,246 A | | 3/1999 | Crawley et al. |

(List continued on next page.)

FOREIGN PATENT DOCUMENTS

| | | |
|---|---|---|
| EP | 0627835 A | 12/1994 |
| WO | WO 99/46899 A2 | 9/1999 |
| WO | WO 00/39967 A2 | 7/2000 |
| WO | WO 00/48367 A2 | 8/2000 |
| WO | WO 01/30035 A2 | 4/2001 |

OTHER PUBLICATIONS

K.C. Chen, "Medium–Access Control of Wireless LANs for Mobile Computing," IEEE Network, vol. 8, No. 5, pp. 50–63 (1994).

(List continued on next page.)

Primary Examiner—Chau Nguyen
Assistant Examiner—Soon-Dong Hyun
(74) Attorney, Agent, or Firm—Squire, Sanders & Dempsey L.L.P.

(57) ABSTRACT

A protocol for a computer network in which routing operation codes (ROCs) in headers of packets transmitted within the network specify to a receiving router which of a number of routing or switching methods to apply to forward associated packets. The packets may be forwarded in any of the following modes: (a) a broadcast mode, (b) a hop-by-hop mode based on receiving node address information, (c) a label swapping mode, (d) a source-switching mode, (e) a flow switching mode, or (f) a hop-by-hop mode based on sending mode address information. In the label swapping mode, packets are accepted by the receiving router if the packets include a media access control address of the receiving router, and packets are forwarded from the receiving router according to a switching table indexed by a media access control address of a transmitting router. In the source switching mode, the headers include source routes specified in terms of local link identifiers used by routers in the network. Also, receiving routers are identified using local link identifiers associated with communication links between a transmitting router and an intended receiving router.

50 Claims, 7 Drawing Sheets

U.S. PATENT DOCUMENTS

| | | | | |
|---|---|---|---|---|
| 5,896,379 | A | * 4/1999 | Haber | 370/390 |
| 5,918,016 | A | 6/1999 | Brewer et al. | |
| 5,926,463 | A | * 7/1999 | Ahearn et al. | 370/254 |
| 5,933,425 | A | 8/1999 | Iwata | |
| 5,964,841 | A | 10/1999 | Rekhter | |
| 5,999,536 | A | * 12/1999 | Kawafuji et al. | 370/401 |
| 6,006,272 | A | 12/1999 | Aravamudan et al. | |
| 6,108,314 | A | * 8/2000 | Jones et al. | 370/294 |
| 6,480,892 | B1 | * 11/2002 | Levay et al. | 709/224 |

OTHER PUBLICATIONS

J.J. Garcia–Luna–Aceves and Marcelo Spohn, "Efficient Routing in Packet–Radio Networks Using LInk–State Information," 1999 IEEE Wireless Communications and Networking Conference, XP–002168435, vol. 3, pp. 1308–1312 (Sep. 24, 1999).

David B. Johnson and David A. Maltz, "Protocols for Adaptive Wireless and Mobile Networking," IEEE Pers. Commun., vol. 3, No. 1 (Feb. 1996).

J.J. Garcia–Luna–Aceves, et al., "Wireless Internet Gateways (WINGS)," Annual Military Communications Conference, New York, New York, XP–000792611, IEEE pp. 1271–1276 (Nov. 3, 1997).

Martha Steenstrup, "Routing in Communications Networks," Chapter 11, pp. v–viii, 351–389 and 390–396, Prentice–Hall (1995).

J.J. Garcia–Luna–Aceves and J. Behrens, "Distributed, scalable routing based on vectors of link states," IEEE Journal on Selected Areas in Communications, vol. 13, No. 8 (1995).

J.J. Garcia–Luna–Aceves and M. Spohn, "Scalable Link-State Internet Routing," Proc. IEEE International Conference on Network Protocols, (ICNP '98), Austin, Texas (Oct. 14–16, 1998).

J. Behrens and J.J. Garcia–Luna–Aceves, "Hierarchical Routing Using Link Vectors," Proc. IEEE Infocomm '98, San Francisco, California (Mar. 29–Apr. 2, 1998).

D. Bersekas and R. Gallager, "Data Networks: Second Edition," Chapter 5, pp. v–xiii and 363–387, Prentice–Hall, Inc. (1992).

J.J. Garcia–Luna–Aceves and E.L. Madruga, "The CoreAssisted Mesh Protocol," IEEE Journal on Selected Areas in Communications, Special Issue on Ad–Hoc Networks, vol. 17, No. 8, pp. 1380–1394 (Aug. 1999).

C. Chiang and M. Gerla, "On Demand Multicast in Mobile Wireless Networks," Proc. IEEE ICNP '98, Austin, Texas (Oct. 14–16, 1998).

S.E. Deering, "Multicast Routing in Internetworks and Extended LANS," Proc. ACM Sigcomm '88, Stanford, California (1988).

Werner Fiebel, "The Encyclopedia of Networking: Second Edition," pp. 72–73, 103–105, 880–890, 1061, and 1070, The Network Press (1996).

B. Davie, P. Doolan, and Y. Rekhter, "Switching in IP Networks," Morgan Kaufman (1998).

G. Markowsky and F.H. Moss, "An Evaluation of Local Path ID Swapping in Computer Networks," IEEE Trans. Commun., vol. COM–29, pp. 329–336 (Mar. 1981).

J. Moy, "OSPF Version 2," RFC 1583, Network Working Group (Mar. 1994).

P. Newman, T. Lyon, and G. Minshall, "Flow Labelled IP: A Connectionless Approach to ATM," Proc. IEEE Infocom '96, San Francisco, CA, pp. 1251–1260 (Mar. 1996).

Yakov Rekhter, et al., "Tag Switching Architecture Overview," Proc. IEEE, vol. 85, No. 12 (Dec. 1997).

M. Schwartz and T. Stern, "Routing Techniques Used in Computer Communication Networks," IEEE Transactions on Communications, vol. COM–28, No. 4, pp. 539–552 (Apr. 1980).

A. Segall and J. Jaffe, "Route Setup with Local Identifiers," IEEE Trans. Commun., vol. COM–34, pp. 45–53 (Jan. 1986).

* cited by examiner

| | |
|---|---|
| VERSION | 32 |
| TIME TO LIVE | 34 |
| RELIABILITY | 36 |
| PRIORITY | 38 |
| ROUTING OPERATION CODE | 42 |
| TRANSMITTER'S MAC ADDRESS | 44 |
| RECEIVER'S MAC ADDRESS (OPTIONAL) | 46 |
| TRANSMITTER-ASSIGNED LINK IDENTIFIER (OPTIONAL) | 48 |
| RECEIVER-ASSIGNED LINK IDENTIFIER (OPTIONAL) | 50 |
| FLOW LABEL (OPTIONAL) | 52 |
| SOURCE ROUTE FIELD (OPTIONAL) | 54 |
| PATH TRAVERSED FIELD (OPTIONAL) | 56 |
| PAYLOAD TYPE (OPTIONAL) | 40 |

FIG. 2

| XLID$_n$ REPORTED BY NEIGHBOR | MAC ADDRESS OF NEIGHBOR "A" USING XLID$_n$ | POINTER TO FST OF NEIGHBOR "A" |
|---|---|---|
| | ⋮ | ⋮ |
| | MAC ADDRESS OF NEIGHBOR "S" USING XLID$_n$ | POINTER TO FST OF NEIGHBOR "S" |
| ⋮ | ⋮ | |
| XLID$_p$ REPORTED BY NEIGHBOR | MAC ADDRESS OF NEIGHBOR USING XLID$_p$ | POINTER TO FST OF NEIGHBOR |

| XLID | NEIGHBOR MAC ADDRESS | POINTER TO AN FST | ... | | ... |
|---|---|---|---|---|---|
| 1 | B | ●→ TO FST FOR B | D | ●→ TO FST FOR D | |
| 2 | C | ●→ TO FST FOR C | | | |
| 3 | E | ●→ TO FST FOR E | | | |

| XLID | FORWARDING INSTRUCTION | | CORRESPONDING MAC ADDRESS |
|---|---|---|---|
| | OUTGOING INTERFACE | OUTGOING LINK-LEVEL INFORMATION | |
| 1 | ● | ● | (B) |
| 2 | ● | ● | (D) |
| 3 | ● | ● | (C) |
| 4 | ● | ● | (E) |

FIG. 7

POINTER FROM NIT

66A

| INCOMING FLOW LABEL | FORWARDING INSTRUCTION | | |
|---|---|---|---|
| | OUTGOING FLOW LABEL | XLID | OUTGOING LINK-LEVEL INFORMATION |
| $fl_1$ | $fl_x$ | 1 | ... |
| $fl_2$ | $fl_y$ | 4 | ... |
| ⋮ | | ⋮ | |

| ROUTER-ASSIGNED LLID | NEIGHBOR MAC ADDRESS | NEIGHBOR ASSIGNED-LLID | POINTER TO FST |
|---|---|---|---|
| 1 | B | 1 | •→ |
| 2 | D | 1 | •→ |
| 3 | C | 2 | •→ |
| 4 | E | 3 | •→ |

FIG. 9

| | FORWARDING INSTRUCTION 72A | | |
|---|---|---|---|
| XLID | RLID | OUTGOING INTERFACE | LINK-LEVEL INFORMATION |
| 1 | 1 | • | • |
| 2 | 1 | • | • |
| 3 | 2 | • | • |
| 4 | 3 | • | • |

FIG. 10

POINTER FROM NIT

| | FORWARDING INSTRUCTION 74A | | | |
|---|---|---|---|---|
| INCOMING FLOW LABEL | OUTGOING FLOW LABEL | XLID | RLID | LINK-LEVEL INFORMATION |
| $fl_1$ | $fl_x$ | 1 | 1 | |
| $fl_2$ | $fl_y$ | 4 | 3 | |
| | | | | |

FIG. 11

SYSTEM FOR ROUTING AND SWITCHING IN COMPUTER NETWORKS

STATEMENT OF GOVERNMENT LICENSE RIGHTS

The United States Government has a paid-up license in portions of this invention and the right in limited circumstances to require the patent owner to license others on reasonable terms as provided for by the terms of Contract No.: DAAH01-98-C-R005, awarded by the U.S. Army Aviation & Missile Command.

FIELD OF THE INVENTION

The present invention relates to routing and switching protocols in computer networks, e.g., ad hoc networks, and may find particular application in such networks that utilize radio communication links and in which routers can have both hosts and networks attached to them.

BACKGROUND

Multi-hop packet-radio networks, or ad hoc networks, consist of mobile hosts interconnected by routers that can also move. The deployment of such routers is ad hoc and the topology of such networks is very dynamic, because of host and router mobility, signal loss and interference, and power outages. In addition, the channel bandwidth available in ad hoc networks is relatively limited compared to wired networks, and untethered routers may need to operate with battery-life constraints. In these networks, routing must preferably be accomplished using as few a number of control messages and neighbor-to-neighbor handshakes as possible, in order to conserve channel bandwidth for user data and preserve the battery life of untethered nodes. Because of the dynamics of the topology in an ad hoc network, broadcast radio links are preferable for interconnecting routers without the need for topology planning.

Presently, packet forwarding in computer networks is generally accomplished using one of three available techniques: bridging, routing, or switching. Bridge protocols permit bridges to forward packets in either of two ways. In one scheme, packets can specify a source route in terms of pairs of unique bridge and network identifiers from source to destination host. Alternatively, bridges may first establish a spanning tree of the network and then send packets over branches of such a tree that appear closer to the destination hosts. The forwarding table used by a bridge to forward packets over the spanning tree has an entry for only those destinations for which packets have been processed by the bridge. The attractive feature of spanning-tree bridges is that packet forwarding is very simple; however, the available network bandwidth is used inefficiently. Source-routing bridges make better use of the bandwidth available in the network, but require a source routing technique that involves the hosts.

Routing protocols permit routers to forward packets either as datagrams or as part of virtual circuits. In both approaches, routers build and maintain a routing table specifying the next hop to each destination. In datagram routing, each packet specifies a source and a destination using addresses that are unique in the entire network or internet; a router forwards each datagram by looking up its routing table for the next hop on a preferred path to the destination.

In contrast to datagram routing, with virtual circuit (VC) routing routers first establish a path from source to destination using a signaling protocol, and then forward packets along the established VCs using VC identifiers. The path taken by the VC is determined based on the information stored in the routing tables of the routers. Such a path is given a virtual circuit identifier and routers maintain a forwarding table listing the next hop of each VC traversing the router. Each packet specifies the VC of the packet, and routers along the VC consult their forwarding tables to forward those packets. A VC is torn down using a signaling protocol when the flow of packets ends.

VCs can be specified with unique identifiers. In such cases, the origin of the VC assigns a number to the VC and the same number is used at every relay router along the VC; the VC number becomes unique together with the identifier of the VC origin. However, to reduce the size of VC identifiers, routers along the path of a VC can assign local identifiers to the VC. With this approach, each router along the path of the VC knows, for every VC local identifier in its forwarding table, the next router on the path of the VC and the VC local identifier used by the next node for this VC. A router in a VC swaps the VC local identifier in the header of an incoming packet into the VC local identifier expected by the next hop in the VC. The advantages of VC routing with local identifiers are: (a) routers use short identifiers to specify and lookup VCs in their forwarding tables, and (b) those short identifiers are used to index an entry in the forwarding table used to forward packets. Because local VC identifiers are short and have fixed length, and because an exact match algorithm is used to forward packets, VC routing with local VC identifiers can be easily implemented in hardware. This approach to packet switching has been called label swapping or label switching in recent literature. See, e.g., B. Davie, P. Doolan, and Y. Rekhter, Switching in IP Networks, Morgan Kaufmann (1998).

Although approaches based on label swapping have received much attention lately, the basic label swapping mechanism and mechanisms to set up states at routers so that they can carry out packet forwarding based on label swapping have been proposed and implemented many times in the past since the mid 1970s. VC routing with local identifiers has been studied by Segall (A. Segall and J. Jaffe, "Route Setup with Local Identifiers," IEEE Trans. Commun. Vol. COM-34, No. 1, January 1986, pp. 45–53), and packet switching based on label swapping has been called ID swapping (G. Markowsky and F. H. Moss, "An Evaluation of Local Path ID Swapping in Computer Networks," IEEE Trans. Commun. Vol. COM-29, March 1981, pp. 329–336), path number and logical record number (M. Schwartz and T. Stern, "Routing Protocols," IEEE Trans. Commun. Vol. COM-28, April 1980). One of the first proposals and implementations of label swapping was the logical record number used by TYMNET in the late 1970s. Id.

Recent proposals for packet switching include: Internet Protocol (IP) switching (P. newman, T. Lyon, and G. Minshall, "Flow labeled IP: A connectionless Approach to ATM," Proc. IEEE Infocom 96, San Francisco, Calif., 1996), tag switching (Y. Rekhter et al., "Tag Switching Architecture Overview," Proc. IEEE, Vol. 85, No. 12, December 1997), MPLS as being developed by the Internet Engineering Task Force, IBM's ARIS, and Toshiba's cell switching router. All these approaches apply label swapping to bypass the network-level lookup of routing tables.

In the IP switching approach, IP switches, which are routers implementing the IP switching approach to packet forwarding, must implement a routing protocol to establish a routing table and packets are first routed using their network addresses. When packets for the same flow start traversing a given IP switch s, that IP switch can assign a local VC identifier to the packet flow and instruct the previous-hop IP switch to use that VC identifier in all packets it forwards to s for that flow. In the same way, the next-hop IP switch can instruct s to use a local VC identifier defined by the next hop in all packets of the flow forwarded by s to the next-hop IP switch. When that happens, IP switch s can bypass its routing-table lookups for packets in the flow and use the label-swapping technique of VC routing with local identifiers.

Tag switching consists of a forwarding component and a control component, similar to the VC routing with local identifiers scheme. A tag switch is a router capable of performing the tag switching mechanism. An entry in the forwarding table (called a tag forwarding information base or TFIB) consists of an incoming tag (equivalent to a VC local identifier) and one or more sub-entries for the tag specifying the outgoing tag, interface and link-level information. The link-level information maintained in the TFIB consists primarily of the medium access control (MAC) address of the next hop. If a switch receives a packet whose tag equals a tag in its TFIB, it swaps the MAC address and label in the incoming packet with the MAC address and label specified in its TFIB and sends the packet over the interface also specified in the TFIB.

The control component of tag switching consists of the advertisement among neighbor switches of the binding between the address of a destination and the incoming tag it uses for the destination. This can be done with a separate tag distribution protocol (TDP) or by including the tag assigned to a destination as an attachment to the updates sent by the routing protocol used in the network. Once a switch assigns an incoming tag to a destination, it can establish an entry in its TFIB when it receives the tag-to-destination binding from the neighbor that it chooses as the next hop to the destination.

All of the above label switching schemes and derivatives thereof share certain common features: For example, in each of these schemes, a single incoming label (called a VC local identifier, path number, or tag, for example) is associated with a single outgoing label for purposes of the label swapping needed to switch packets towards a given destination or for a given VC. Also, the labels refer to destinations or associations between a source and a destination. The mapping established at a node between a destination (or VC) and an incoming label (called a VC local identifier, path number, or tag, for example) is disseminated among neighbor nodes by means of explicit exchanges of control information. This signaling is carried out in addition to the signaling required to maintain routing tables based on destination addresses. Further, the unique addresses of both the sending and receiving nodes are specified in the headers of the packets being forwarded by means of label swapping. This information is used to ensure that only the receiving node addressed in the packet accepts the packet and associates the label in the packet with the correct outgoing label.

Furthermore, the descriptions of tag switching and IP switching assume the existence of a loop detection mechanism when switches establish their label-to-destination mappings. A loop consists of the forwarding along a loop of packets that set up label-swapping states in the routers, until an external action is taken, such as exhausting a "time to live" for the packet. The loop detection mechanism adopted in these prior schemes consists of using a path vector in the header of packets that establishes the binding between the labels used to forward traffic. The path vector in a state setup packet specifies the routers that have been visited by the packet. Another technique used to cope with the looping of state setup packets is to simply decrement a time-to-live field in the packet header to allow the packet to visit a maximum number of hops trying to set up state. Loop detection is still an open issue under discussion for MPLS.

The differences among the label swapping or label switching schemes proposed to date lie in the purpose for which a label state is established at the routers (e.g., destination oriented, virtual circuits, etc.) and the specific mechanisms in the protocols used to set up the label-swapping state at the routers. The distribution of label-binding information among routers in the prior schemes can be characterized in two ways: piggybacking the distribution on top of routing protocols, or using a separate protocol for label distribution. Because the labels used in the above label switching proposals refer to either destinations or associations between sources and destinations, the routing protocols that can be used for the dissemination of such information are distance-vector or path-vector oriented. To date, routing protocols based on link-state information (e.g., OSPF) have been considered to be poor choices for distributing label-binding information. B. Davie, P. Doolan, and Y. Rekhter, Switching in IP Networks, Morgan Kaufmann, 1998.

Source routing has also been implemented and used for routers, and can be considered a hybrid between datagram routing and label switching. With source routing applied to routers, the header of a packet specifies the source route consisting of the entire path from source to destination; the source route is specified in prior routing schemes using the unique addresses of the routers in the path to the destination. A well-known example of this approach is the source route option in IPv4.

The source route can be obtained by the source of the packet in two ways. The router can compute the source route locally if it knows the entire network topology; alternatively, a path search packet can be sent hop-by-hop to the destination to gather the source route, and the destination can send a reply back to the source with the source route. All existing source routing proposals specify source routes in terms of the nodes along the path from source to destination.

SUMMARY OF THE INVENTION

In one embodiment, a protocol for a computer network in which routing operation codes (ROCs) in headers of packets transmitted within the network specify to a receiving router which of a number of routing or switching methods to apply to forward associated packets. The packets may be forwarded in any of the following modes: (a) a broadcast mode, (b) a hop-by-hop mode based on receiving node address information, (c) a label swapping mode, (d) a source-switching mode, (e) a flow switching mode, or (f) a hop-by-hop mode based on sending mode address information.

In the broadcast mode, packets transmitted by a first router are accepted by all neighboring routers of the first router. In the hop-by-hop mode based on receiving node address information, packets are accepted by the receiving router if the receiving node address information matches the receiving router's media access control address. In the label swapping mode, packets are accepted by the receiving router if the packets include a media access control address of the receiving router, and packets are forwarded from the receiving router according to a switching table indexed by a media access control address of a transmitting router. In the source switching mode, the headers include source routes specified in terms of local link identifiers used by routers in the network. In the flow switching mode, receiving routers are identified using local link identifiers associated with communication links between a transmitting router and an intended receiving router, which along with the local link identifier is used as a criterion upon which a receiving router accepts or rejects a packet.

The local link identifiers may be obtained using either a flood search method or through a routing protocol operating within the network. In the source switching mode the receiving router forwards a received packet according to a local link identifier specified in a source route portion of an associated header.

In the flow switching node, flow states at routers of the network are established according to information in data packets transmitted within the network. The information included in the data packets allows for bindings between incoming and outgoing flow labels to be established at each of the routers. Such information may include a flow label and a source route to a destination node in the network.

In a further embodiment, forwarding a packet from a first router of a computer network to a second router thereof is achieved according to a routing operation code specified in a header of the packet. The routing operation code may specify any of the above modes and the value thereof determines what other types of information are included in the header of the packet. In some cases, the sending node address information (e.g., its MAC address) is included in the header of the packet. Also included may be the receiving node address information (e.g., MAC address), receiving node—assigned local link identifier, flow label and/or source route.

In the source switching mode, a sending node obtains a source route to an intended destination using either of a flood search process or a routing protocol operative within the computer network. In the source switching mode, the packet is forwarded from the first router by reading a source route specified in the header and substituting a transmitting router local link identifier and if present, a receiving router local link identifier, included in the header with corresponding values needed by the second router. In the flow switching mode, the packet is forwarded from the first router by reading a source route specified in the header and substituting a flow label included in the header with a corresponding value needed by the second router.

In some cases, the packet is a data packet that includes flow setup instructions for the second router. In such cases, the packet's header includes a MAC address of the first router and a local link identifier assigned by the first router and may also include a flow label and a source route or a flow label and a path traversed field.

In yet another embodiment, a packet header includes a routing operation code configured to indicate to a receiving router which of a variety of routing and/or switching methods to apply in forwarding an associated packet. Such routing and/or switching methods may be any of: (a) a broadcast mode, (b) a hop-by-hop mode based on address information regarding the receiving router, (c) a label swapping mode, (d) a source switching mode, (e) a flow switching mode, and (e) a hop-by-hop mode based on address information regarding a transmitting router. The routing operation code generally determines which of the following fields of information are included in packet header: (a) address information of the receiving router, (b) local link identifier information assigned by: (i) a transmitting router and/or (ii) the receiving router, (c) a flow label, (d) a source route, (e) a path traversed, and (f) a payload type.

Another embodiment provides a router having a neighbor identification table configured to allow the router to determine whether a received packet should be accepted and, if so, which of a number of switching tables to access to retrieve information for forwarding the packet within a computer network. The switching tables may include a source switching table, configured to provide packet forwarding information which the router is to use to forward the packet using a source switching process, and/or a flow switching table, configured to provide packet forwarding information when the router is to forward the packet using a flow switching process.

The neighbor identification table is arranged so as to be indexed using local link identifiers assigned by neighboring routers to links communicatively coupling the router thereto and/or to provide pointers to source switching and/or flow switching tables. The source switching table is arranged so as to be indexed according to local link identifiers assigned by neighboring routers to links communicatively coupling the router thereto. The flow switching table specifies mappings from incoming flows to outgoing flows, local link identifiers for next hops and associated link-level information.

BRIEF DESCRIPTION OF THE DRAWINGS

The present invention is illustrated by way of example, and not limitation, in the figures of the accompanying drawings in which like reference numerals refer to similar elements and in which:

FIG. 2 illustrates an example of a packet header for transporting routing and switching information in accordance with an embodiment of the present invention;

FIG. 6 illustrates an example of a neighbor identification table for one of the routers of the network shown in FIG. 5;

FIG. 7 illustrates an example of a source switching table for one of the routers of the network shown in FIG. 5;

FIG. 8 illustrates an example of a flow switching table for one of the routers of the network shown in FIG. 5;

FIG. 9 illustrates another example of a neighbor information table for a router of the network shown in FIG. 5;

FIG. 10 illustrates another example of a source switching table for one of the routers of the network shown in FIG. 5; and FIG. 11 illustrates another example of a flow switching table for one of the routers of the network shown in FIG. 5.

DETAILED DESCRIPTION

Figure 1:
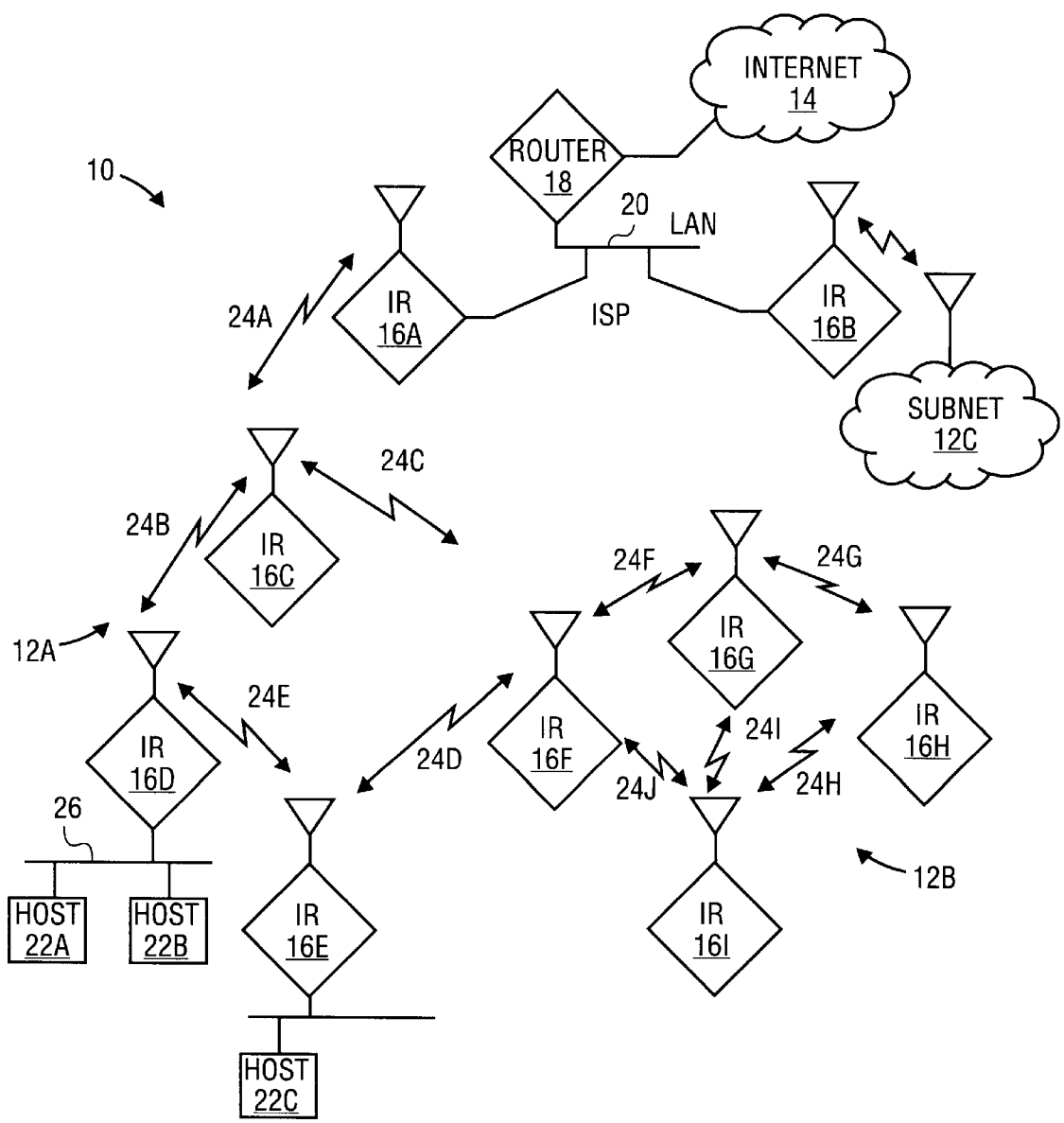
FIG. 1 illustrates an example of an ad hoc wireless network with routers configured in accordance with the present routing protocol.

A scheme for integrating routing and switching in computer networks is disclosed herein. Although discussed with reference to certain illustrated embodiments, upon review of this specification, those of ordinary skill in the art will recognize that the present scheme may find application in a variety of systems. Therefore, in the following description the illustrated embodiments should be regarded as exemplary only and should not be deemed to be limiting in scope.

The present scheme enables multiple routing and switching methods in the same network. Each packet being routed includes a routing operation code (ROC) instructing the receiving router which routing or switching method to apply to forward the packet. A packet can be forwarded in any of the following forwarding modes:

(a) a basic broadcast mode, in which the packet sent by a router is accepted by all its neighbors;

(b) a conventional hop-by-hop mode, in which the packet is accepted by a router based on the receiver MAC address specified in the packet header and then passed to a higher layer for further processing;

(c) a conventional label-swapping mode, which uses the unique MAC address of the receiver specified in the packet to decide whether to accept a packet or not, and uses the unique MAC address of the sender and a flow label to forward an accepted packet according to a switching table;

(d) a source-switching mode, in which the entire source route is specified in the packet using local link identifiers instead of the unique addresses of relay routers as is common in previous source routing approaches. This use of local link identifiers is further explored in co-pending application Ser. No. 09/418,700 entitled "System for Communicating Labeled Routing Trees to Establish Preferred Paths and Source Routes with Local Identifiers in Wireless Computer Networks", filed Oct. 15, 1999, assigned to the Assignee of the present invention and incorporated herein by reference;

(e) a flow-switching mode, which differs from conventional switching methods based on label swapping in that only the unique MAC address of the sender of the packet is used and the receiver is identified by means of local link identifiers associated with the link between the sender and the intended receiver of the packet (see the above-cited co-pending application for further details); or (f) a basic incremental (hop-by-hop) mode, in which the packet is accepted by a router based on the unique MAC address of the sender and one of multiple local link identifiers specified in the packet header. The packet is then passed to a higher layer for further processing and routing.

The various forwarding modes are enabled by a flow switching protocol.

In the first three of the above forwarding modes, packets are accepted based entirely on the MAC addresses of the sender and receiver nodes carried in the packet header. However, in the latter three forwarding modes, packets are accepted based on local link identifiers carried in the packet header. The local link identifiers assigned by the router to links with its neighbors and those assigned by the router's neighbors to links with the router can be obtained by the flow switching protocol through a channel access protocol, such as the one proposed in co-pending application Ser. No. 09/248,738, entitled "Adaptive Communication Protocol for Wireless Networks", filed Feb. 10, 1999, assigned to the Assignee of the present invention and incorporated herein by reference.

This flow switching protocol obtains source routes to destinations in one of two ways: (a) on demand, in which case search messages are sent out to obtain the source routes, or (b) by working in combination with a routing protocol that can provide source routes. These source routes are specified in terms of transmitter-assigned local link identifiers (LLIDs) given to the links along the path from the source router to the destination. In addition to saving communication bandwidth, using LLIDs permits the forwarding of packets with such source routes to be done using a direct index into a forwarding table, which can be easily done in hardware.

The source-switching mode is implemented by packet headers specifying a source route in terms of the address of the router that originated the packet and a sequence of LLIDs specifying the path to a destination, and by routers maintaining a table of all LLIDs assigned to the router by its neighbors. When a router receives a packet specifying source switching, the router accepts the packet based on the LLIDs specified for the next hop of the packet, and forwards the packet to the neighbor router indicated by the match between the LLID of the next hop specified in the source route and the LLIDs the router assigned to the links with its neighbors.

The flow switching mode is implemented by routers maintaining a switching table similar to that used in label switching. Routers can use either incremental or source-switching flow establishment, which processes are described below. Both approaches use data packets to establish the flow state and the result of sending the flow establishment data packet is the establishment of the binding between incoming and outgoing flow labels at each router in the path from source to destination. A packet intended for a flow that is already established specifies the flow switching mode in the ROC of the packet, the flow label assigned by the sending node, the address of the sending node, and the LLIDs assigned to the link in use by the sending and receiving node. An entry in the flow-switching table is erased either after a timeout or the processing of a packet with an ROC with a flow-termination code.

The flow state needed to carry out flow switching is established at routers by either flow establishment using source switching, or incremental flow establishment. With flow establishment by source switching, the source of a packet stream or flow assigns a flow label to the flow and sends a first packet with a source route to the destination of the flow, the flow label for the flow, and an ROC instructing the relay routers to use source switching to forward the packet and to establish an entry in their flow switching tables for the flow as well. A relay router that receives the packet assigns a flow label to the flow, makes an entry in its flow-switching table with the mapping of the incoming and the outgoing flow labels and the associated neighbors along the path for the flow, and relays the packet with the same ROC, the new flow label, the source route, and an index to the source route pointing to the next-hop router as the first non-traversed hop of the source route.

With incremental (or hop-by-hop) flow establishment, the source and each relay router in the path from the source to the destination of the flow decides how the packet should be forwarded. The ROC of the packet specifies hop-by-hop flow establishment, which instructs the router to look up its routing table to determine the next hop, and to establish the binding between incoming and outgoing flow labels. The header of the flow-establishment data packet carries a path vector specifying the source and the LLIDs of the routers visited by the flow-establishment data packet. In one embodiment of the present scheme, source-switched flow establishment is adopted because the amount of information in the headers of flow-establishment packets is the same and the processing of packets in source switching mode is much faster than in hop-by-hop routing.

As in prior schemes, a router can assign a flow label to a packet flow in many different ways. One approach consists of using the same flow label for any flow intended for the same destination and the same type of service. Although many variations of packet switching based on label swapping and source routing have been implemented in the art, the present scheme is unique in a number of ways, including:

(a) It obtains local link identifiers of all the links needed to route or switch packets on a hop-by-hop or source route basis.

(b) It uses local link identifiers to identify the next router to process the packet, which makes more efficient use of bandwidth while still enabling the packet forwarding based on flow labels or source routes to be done in hardware.

(c) It switches packets from source to destination without the possibility of looping by specifying the LLIDs along the path in the packet headers, and enables this type of switching to be done in hardware.

(d) It can switch packets based on label swapping such that:
  (i) The mapping between flow labels and neighbor nodes is established on demand (i.e., not for every destination or flow).
  (ii) Data packets are used to set up flows, and there is no separate signaling protocol needed other than the routing instructions in the headers of the packets.
  (iii) There is no looping of data packets used to set up flows. The flow switching protocol can be implemented at the link layer or below. It can be used to encapsulate IP packets directly, or to encapsulate MAC packets.

(e) It can switch packets from one router to one or multiple neighbors by specifying such neighbors using one or multiple local link identifiers.

The present scheme is well suited for wireless and wired networks and the IP internet, in which routers are interconnected by point-to-point or broadcast links (e.g., local area networks) to one another. The present invention is also well suited for an ad hoc network that provides a seamless extension of the IP Internet to the ad hoc wireless environment. FIG. 1 illustrates aspects of an exemplary ad hoc internet.

Ad hoc network 10 may be considered as a number of sub-networks 12a, 12b, 12c, which provide an extension of the Internet 14 through a number of Internet Radios or IRs 16a–16i. Each IR 16a–16i is a wireless router with an assigned IP address and a MAC address. In general, IRs 16a–16i operate over one or a multiplicity of radio channels using spread-spectrum wireless communication techniques common in the art. For example, the IRs 16a–16i may operate in one of the unregulated UHF frequency bands, thereby obviating the need for operating licenses. Coupling of ad hoc network 10 to the Internet 14 is achieved through a router 18, which may be operated by an Internet Service Provider (ISP). As shown, a single ISP may operate a LAN 20 to which multiple IRs are connected. In such a scheme, IRs 16a and 16b may act as "AirHeads", providing gateway service to Internet 14 via router 18. Some IRs, e.g., IRs 16d and 16e of FIG. 1, may be associated with hosts, 22a, 22b and 22c, which can be accessed by any Internet user through ad hoc network 10. Like any router, each IR 16a–16i processes all messages, changes in the cost of an adjacent link, adjacent-link failures, and new-neighbor notifications one at a time and in the order in which it detects them.

Any IR 16a–16i in FIG. 1 can consider another IR to be adjacent (we call such an IR a "neighbor") if there is radio connectivity between the two IRs and one IR, e.g., IR 16g, can receive and acknowledge packets from the other IR, e.g., IR 16h. Accordingly, a physical broadcast link connecting multiple IRs is mapped into multiple point-to-point bidirectional links defined for the same IRs. Each pair of adjacent IRs defines two point-to-point bidirectional links between them, one in each direction. Each point-to-point bidirectional link has a head node of the link and a tail node of the link.

As indicated above, the flow switching protocol for use in ad hoc network 10 in accordance with the present invention supports a variety of packet forwarding modes. This flow switching protocol obtains source routes to destination on demand, where source routes are specified in terms of transmitter-assigned LLIDs regarding the links along the path from the source router to the destination, or works in combination with a routing protocol capable of obtaining such source routes. The flow switching protocol then uses LLIDs to support the various packet forwarding modes. If the flow switching protocol is used in combination with a routing protocol that can provide source routes to destinations expressed in terms of the LLIDs of the links traversed in those routes, the flow switching protocol does not incur more traffic than that needed for the transfer of data packets themselves. In addition, the use of LLIDs in the forwarding modes of the flow switching protocol enables the implementation of all its packet forwarding functions in hardware.

I. Deriving Source Routes with Local Link Identifiers

In one embodiment, the present scheme works in combination with a routing protocol that incorporates local link identifiers (LLIDs) as part of the routing information exchanged among routers. Such a routing protocol can be the Adaptive Internet Routing (AIR) protocol described in co-pending application Ser. No. 09/418,700, entitled. "System for Communicating Labeled Routing Trees to Establish Preferred Paths and Source Routes with Local Identifiers in Wireless Computer Networks", in which routers communicate labeled routing trees (LRTs). A link from node x to node y in an LRT is given a local link identifier (LLID) by x, the head of link (x,y). A second example of a routing protocol that can be used in combination with the present scheme is a modification of a topology-broadcast protocol (e.g., OSPF J. Moy, "OSPF Version 2," RFC 1583, Network Working Group, March 1994) in which each directed link is assigned an LLID by the head of the link, and the LLID of a link is communicated in every link state update for that link. Still another example of a routing protocol that can be used in combination with the present invention is a modification of a path-vector protocol (e.g., BGP) such that the paths from source to destinations are specified in terms of both the routers used in the paths, as well as the LLIDs of the links in the same paths; the LLID of a link in a path is given by the head of that link.

The routing protocol assumed for the operation of the present scheme also provides a routing table with the distance and next hop to each destination. The source routes needed by a router can be computed on demand by the source of a packet that is to be source switched to the destination. Alternatively, the routing table may also include the source route specified in terms of LLIDs for each destination. Multiple routing entries for the same destination may be provided, i.e., up to one entry per neighbor per destination, and one or multiple routing entries may be provided for each type of service defined in the system.

The preferred approach for this embodiment would be based on its combined use with the Adaptive Internet Routing (AIR) protocol, simply because of the performance improvements derived from AIR compared to the other three alternatives listed above. Nevertheless, in another embodiment of the present invention, no routing protocol is assumed for its operation, and routes to destinations specified in terms of LLIDs may be obtained on demand. In this case, a router that originates a packet for a destination and has no routing information for that destination may send search packets to its neighbors in order to find an intended destination. The search packet sent to a given neighbor specifies: the address of the intended destination, the address of the intended receiver of the packet, and a source route. The source route of the packet is specified in terms of the address of the source router and the LLID assigned by the source router to the link with its neighbor. A router receiving a search packet that does not have a routing entry for the intended destination forwards the packet to each of its neighbors other than the one from which the packet is received, and the packet specifies: the address of the intended destination, the address of the intended receiver of the packet, and a source route with the LLID of the link from the sending router to the intended receiver added. A router receiving the search packet that has a source route (specified in terms of LLIDs of the links in the path to the destination) sends a reply with the entire source route consisting of the source router address and the sequence of LLIDs for all the links in the path to the destination.

II. Information Contained in Packet Headers

In the present scheme, the header of a packet specifies a switching or routing instruction that instructs the router to process the packet in one of multiple possible switching or routing modes, and specifies the additional information needed for the router to carry out the operation. In an IP internetwork or an ad hoc network extending the IP Internet, the flow switching protocol of the present invention could be used to carry IP packets or it could be used to carry MAC-layer packets that in turn encapsulate IP packets. For purposes of clarity, we omit the description of conventional framing and error detection functionalities that may also be present in the packet header, and describe the operation of the flow switching protocol in general terms applicable to the forwarding of IP packets and MAC-layer packets.

FIG. 2 presents a canonical packet-header format, which illustrates the type of routing and switching information used in one embodiment of the present scheme, as well as the combination of the various types of information. Various fields in the canonical packet header 30 can be required fields or optional fields. Some of the innovative features of canonical packet header 30 stem from the use in various combinations of switching and routing instructions, local link identifiers, source routes specified with local link identifiers, and other forwarding labels, to enable different routing and switching operations on data packets within the same unifying packet processing framework.

The canonical packet header description shown in FIG. 2 omits framing and error checking fields that may be present in an actual implementation. It should be evident to those of ordinary skill in the art that, depending on a variety of implementation issues (e.g., bandwidth available in the communication links) this canonical format can be implemented in a variety of ways, ranging from the number of bits used in each field and the the position of the fields in the packet header, to the use of extension headers in order to simplify the processing of the most commonly transmitted types of packets. In addition, the canonical packet header 30 described herein can be part of a larger packet header.

A version (V) field 32 specifies the version of the protocol to be used to process the packet. The time to live (TTL) field 34 specifies an upper bound in terms of hops or time, beyond which the packet should be dropped to prevent packets from remaining in the network indefinitely. The reliability (R) field 36 specifies the degree of reliability with which the packet must be successfully forwarded by the router. The priority (P) field 38 specifies the priority that the packet should be assigned in the transmission queues of the router. The payload type (LOAD) field 40 is optional and specifies the type of payload that follows the header; if the field is omitted the payload is assumed to be a packet using a predefined MAC protocol, such as the REALM protocol described in co-pending application Ser. No. 09/248,738, entitled "Adaptive Communication Protocol for Wireless Networks".

The routing operation code (ROC) 42 specifies the instruction (e.g., in binary code format) to be used on the packet, i.e., how the packet should be processed. The value specified in the ROC field 42 determines which other fields should be present in the header 30. The routing and switching modes include but are not limited to: basic broadcast mode (ROC=0), hop-by-hop mode (ROC=1), label swapping mode (ROC=2), source switching mode (ROC=3), flow switching mode (ROC=4), source-switched flow establishment (ROC=5), and incremental flow establishment (ROC=6).

The transmitter's MAC address (XADD) field 44 identifies the sender of the packet and should always be present in a packet header 30. The receiver's MAC address (RADD) field 46 is optional and identifies the receiver of the packet; the RADD is present in the header when the ROC specifies a routing or switching mode based on the sender and receiver MAC addresses; examples of these modes are normal packet routing and tag switching.

The transmitter-assigned link identifier (XLID) field 48 is optional and is present when the ROC specifies a forwarding operation in terms of the LLID of the link to the next hop for the packet. The XLID specifies the local link identifier assigned by the transmitter to the link with one of its neighbors. A router cannot assign the same XLID to more than one link with a neighbor.

The receiver-assigned link identifier (RLID) field 50 is optional and specifies the local link identifier assigned by the intended receiver of the packet to the link with the transmitting router. An RLID reported by router x in a packet destined for neighbor y is, therefore, the XLID that x knows y has assigned to the link (y, x). The RLID field 50 is present in the packet header 30 when the ROC specifies the source switch or flow switch mode and the lookup at the receiver is accomplished based on receiver-assigned link identifiers. When RLIDs are used in packet headers, a router accepts the packet based on the XADD, XLID, and RLID fields, 44, 48 and 50, of the header.

The flow label (FL) field 52 is optional and is present when the ROC specifies the flow switching mode. The FL specifies the label assigned to a flow of packets by the transmitting router. To minimize the number of flow labels routers have to remember, it may be assumed that a router assigns the same flow label to packets of the same traffic class flowing to the same destination.

The source route field 54 is optional and is present when the ROC specifies any forwarding operation involving source switching. It may include three sub-fields (not shown in detail), a hop count (HC) specifying the number of entries in the source route, a pointer to the next hop (PNH) indicating the XLID that the receiving router should read to forward the packet, and a source route (SR) consisting of one or more XLIDs.

The path-traversed field 56 is optional and is present when the ROC specifies hop-by-hop flow establishment. It includes of a hop count specifying the number of routers visited by the packet, and the ordered sequence of MAC addresses of the routers visited.

III. Switching Information Maintained at Routers

The switching information maintained at routers is used to switch packets below the IP layer. As will be apparent to those of ordinary skill in the art from the subsequent description, the introduction of XLIDs and RLIDs in the present scheme reduces the amount of bandwidth consumed by packet headers and, more importantly, enables the implementation of flow and source switching modes in simple hardware. This makes packet switching according to the present invention much faster than routing packets by table lookups, even if the fast table lookup technology of prior schemes is utilized.

Figures 3, 4:
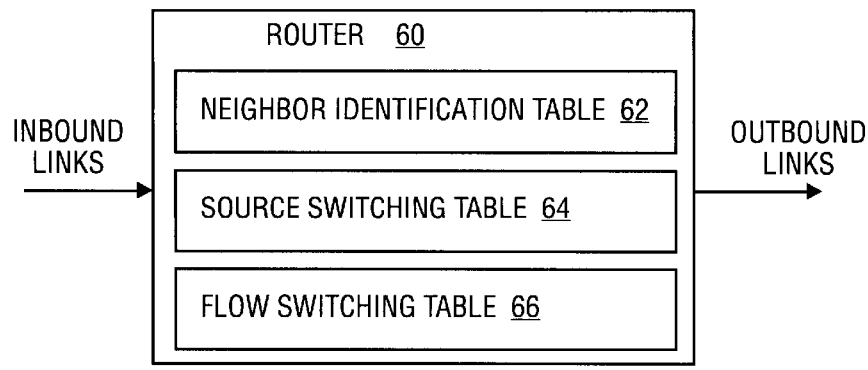
FIG. 3 illustrates an example of a router configured with switching tables in accordance with an embodiment of the present scheme.
FIG. 4 illustrates an example of a neighbor identification table configured in accordance with an embodiment of the present scheme.

As shown in FIG. 3, each router 60 maintains three types of switching tables: a neighbor identification table (NIT) 62, a source switching table (SST) 64 and a flow switching table (FST) 66 for each neighbor. The NIT 62 permits a router to determine if a received packet is intended for that router and, if so, which switching table to use to forward the packet. The SST 64 specifies the forwarding instructions a router should follow to forward packets in source switching mode. Each FST 66 specifies the mapping from a given incoming flow label to the outgoing flow label, the necessary LLIDs to identify the next hop, and the necessary link-level information for the transmission of the packet to the next hop.

Below are presented two examples for the maintenance of switching information in the present routing scheme, which embodiments differ depending upon whether or not receiver-assigned LLIDs are used for source switching or flow switching.

III1. Information Stored for Switching

A. Using Transmitter-assigned LLIDs

In one embodiment of the present scheme, only transmitter-assigned LLIDs are used to identify links between neighbors. In this case, the RLID field 50 is not used for flow switching or source switching, and the NIT 62 is indexed according to links incident into the router and provides pointers to the SST 64 and the FST 66 as needed.

More specifically, the keys for the NIT are the XLIDs reported by the neighbors of the receiving router for their links to that router. One or more neighbors of the subject router may use the same XLID value 48 to label their links to the router. Accordingly, as shown in FIG. 4, the entry 68 in the NIT 62 is an array consisting of zero or more array entries, each array entry corresponding to a neighbor that uses the value of the XLID for a link to the router and including: (a) the MAC address of the neighbor and (b) a pointer to the FST of the neighbor. In one embodiment, a router has relatively few neighbors (e.g., up to 64 neighbors) and searching on the XLID as the key is, consequently, very fast. Furthermore, if a router has N neighbors, the total number of array entries in the NIT 62 is N; hence, in the worst case a router has to search in a list of up to N entries (either all its neighbors use different XLIDs for their links to the router, or all its neighbors use the same value of XLID for their links to the router).

Figure 5:
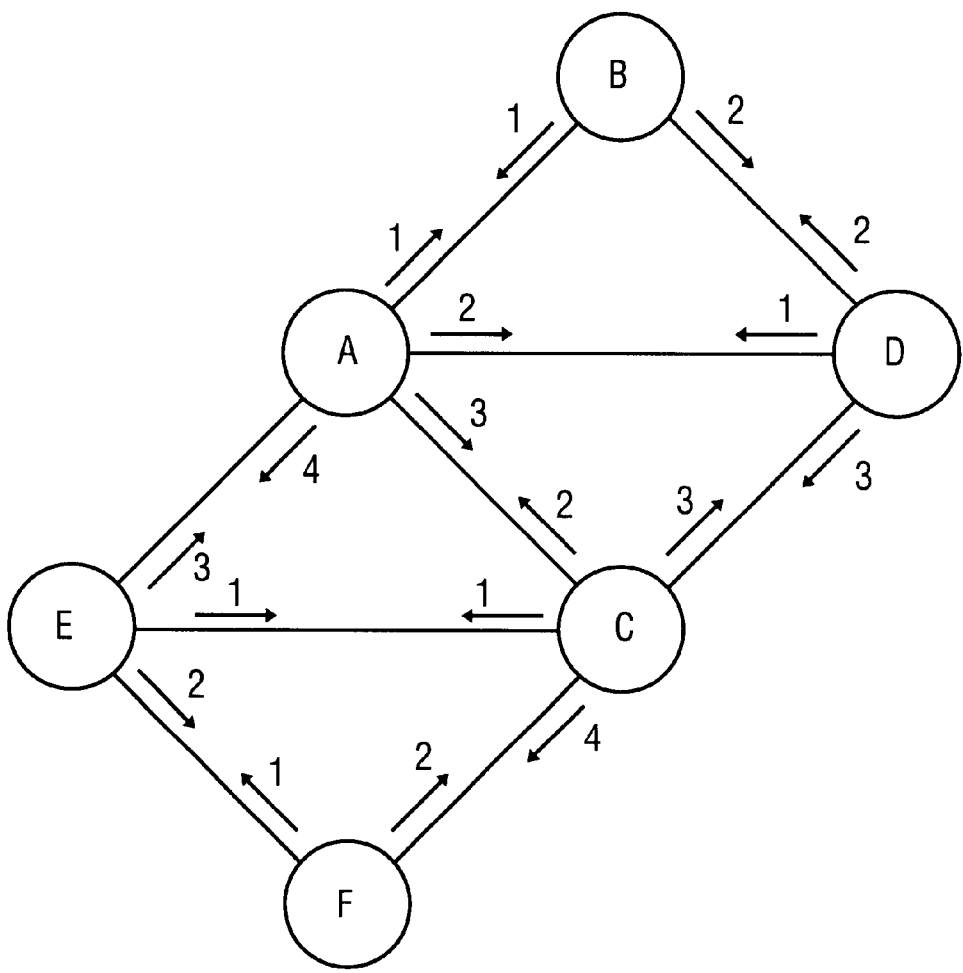
FIG. 5 presents an example of local link identifiers assigned by routers of an ad hoc network.

FIG. 5 shows an example network consisting of six routers (A–F) connected by point-to-point links. Circles indicate routers and lines indicate the links between them. The label inside a circle indicates the MAC address of the router, and the arrows and labels next to the links connecting the routers indicate the XLIDs assigned by a router to each link with a neighbor. For example, router A assigns XLID=4 to its link with router E. Note that no router assigns the same XLID to more than one link, and that multiple neighbor routers may use the same XLID for the same router. For example, routers B and D assign XLID=1 for their links with router A, and routers A and B assign XLID=2 for their links with router D.

Continuing with the same example network FIG. 6 shows the NIT 62A at router A of FIG. 5. Note that the index values used in the NIT 62A are those assigned by router A's neighbors to the links incident into router A, not XLID values assigned by router A to links outgoing from router A to its neighbors. In the present example, router A has two neighbors, routers B and D, using the same value of XLID=1 to refer to links incident into router A. This is not a problem due to the array structure of NIT 62A, which specifies the MAC address of each neighbor of router A using a given XLID to denote an incident link into router A and a pointer to the proper FST, which is to be used to process packets in flow switching mode. Note also that the NIT 62A of router A has only four table entries, corresponding to four neighbors (B, D, C, and E).

Because a source route in a packet header specifies the next hop to which the receiving node should forward the packet, an SST 64 is indexed on the XLID values that the router assigns to its outgoing links with neighbors. Each entry in an SST 64 specifies an outgoing interface and link-level information for the transmission of the packet to the next hop. Continuing with the same example network of FIG. 5, FIG. 7 shows the SST 64A at router A; the MAC addresses of neighbor routers are shown in parenthesis since they are not stored in the SST. Note that the four entries indexed by XLID value correspond to the four links going from router A to its neighbors.

As earlier stated, a router maintains a flow switching table (FST) 66 for each neighbor router. The FST for a given neighbor is indexed according to the values of the incoming flow labels used for flow switching. For a given value of an incoming flow label, the FST specifies the value of the outgoing flow label, link-level information for the transmission of the packet to the next hop, and the value of the XLID to be used when a packet is forwarded to the next hop in flow switching mode. The use of the latter entry is unique in the present scheme relative to all prior packet switching techniques based on label swapping.

Using the same example network of FIG. 5, FIG. 8 shows the FST 66A at router A for its neighbor router D. It is assumed that two flows going from D to A have been established already. One flow is identified with the incoming flow label fl1 and the other with incoming flow label fl2. For fl1, the forwarding instruction in the FST 66A specifies that router A should swap fl1 for flx when it forwards a packet for the corresponding flow, and that it should specify XLID=1 in the packet header and forward the packet to neighbor router B. The routing instruction also specifies all the necessary link-level information, which is dependent on the type of network being used (e.g., an ad hoc network or a wired network).

III.2. Information Stored for Switching Using Receiver- and Transmitter-assigned LLIDs In an alternative embodiment of the present scheme, routers use the receiver-assigned link identifier (RLID) field 50 to identify a given link with the local link identifiers assigned by each end of the link. The headers of packets to be forwarded according to source switching and flow switching specify the RLID in addition to the XLID.

In this embodiment, the NIT at each router is indexed by the RLID, i.e., the local link identifier assigned by the router to its outgoing links, which is specified by a neighbor router in the header of the packet. The NIT entry for a given value of the RLID specifies the MAC address of a neighbor, the XLID assigned to the link by the router, and a pointer to the FST for that neighbor. Continuing with the same example network of FIG. 5, we note that any router knows the LLID assigned by each of its neighbors to the link from the neighbor to the router. Router A, for example, knows that router E assigned the LLID=3 to the link from E to A. This information can be made available to the flow switching protocol by different means, including an underlying channel access layer and a routing protocol.

FIG. 9 shows the NIT 70A at router A of FIG. 5. Note that the index values used in the NIT 70A are now the RLIDs assigned by the subject router to each of its neighbors, and all such RLIDs are different from each other. The NIT 70A specifies the MAC address of a neighbor, the LLID assigned by the neighbor to the link with the router, and a pointer to the FST used when packets are flow switched.

A router accepts a packet based on the values of the XADD, XLID, and RLID fields, 44, 48 and 50, of the packet header. More specifically, the RLID field 50 identifies the entry of the NIT that should be further examined, if no entry of the NIT is labeled with a value equal to the RLID of the packet, the packet is discarded. If the XADD and XLID do not correspond to the MAC and LLID values of the NIT entry specified by the RLID value, the packet is discarded.

The SST is indexed on the XLID values that the subject router assigns to its outgoing links with neighbors. Each entry in the SST specifies the LLID assigned to the link by the neighbor router (RLID to be used in a packet header), outgoing interface, and link-level information for the transmission of the packet to the next hop. Continuing with the same example network of FIG. 5, FIG. 10 shows the SST 72A at router A.

The FST for a given neighbor specifies, for a given value of an incoming flow label, the value of the outgoing flow label, link-level information for the transmission of the packet to the next hop, and the value of the XLID and RLID to be used when a packet is forwarded to the next hop in flow switching mode. Using the same example network of FIG. 5, FIG. 11 shows the FST 74A at router A for its neighbor router D. It is assumed that two flows going from D to A have been established already. One flow is identified with the incoming flow label fl1 and the other with incoming flow label fl2. For fl1, the forwarding instruction in the FST 74A specifies that router A should swap fl1 for fix when it forwards a packet for the corresponding flow, and that it should specify XLID=1 in the packet header and forward the packet to neighbor router B.

IV. Packet Forwarding Modes

We now describe how the present scheme supports a number of routing and switching modes of packet forwarding operations based on the information specified in packet headers and routing and switching information maintained at routers. The overall handling of packets by the present flow switching protocol can be described by the following pseudo-code.

Procedure Process-Packet
{called by packet arriving at router}
do CASE
    ROC=0: call Broadcasting
    ROC=1: call Hop_by_Hop
    ROC=2: call Label_Swapping
    ROC=3: call Source_Switching
    ROC=4: call Flow_Switching
    ROC=5: call Source_Switched_Flow
    ROC=6: call Incremental_Flow
    ROC=7: call Incremental_Switching
End Process-Packet In the following, we describe each packet forwarding mode used to process packets. This description considers the two alternative embodiments discussed above.

IV.1. Basic Broadcasting and Conventional Point-to-Point Transmissions

A router sends a packet with a header specifying ROC=0 to force all its neighbors process the packet and pass it to a higher layer, where additional processing takes place. A router receiving a packet with its header specifying ROC=0 simply accepts the packet and passes it to the higher layer. This packet-forwarding mode could be used to support network-layer control functions requiring routers to communicate with all their neighbors.

The point-to-point mode is used to simply pass information from one router to one of its neighbors or to a subset of its neighbors using a multicast MAC address. In this case, the header of the packet specifies ROC=1 and includes the RADD field 46. A router that receives the packet with ROC=1 accepts the packet if the RADD in the packet header equals the router's own MAC address or a multicast MAC address to which the router belongs. In such a case, the accepted packet can be routed at the higher layer (e.g., the IP layer) using a standard routing table based on destination addresses. The final destination of the packet or a conventional source route should be included in the payload that follows the packet header, just as is the case for IP packets encapsulated in frames that are formatted according to IEEE Standard 802.3.

IV.2. Conventional Label Swapping

In the label-swapping mode, the header of a packet specifies ROC=2 and includes the RADD and FL fields 46 and 52. Packets are switched to their destinations in much the same way as in other protocols based on local VC identifiers. A router accepts a packet based on the RADD in the header, and the accepted packet is forwarded by swapping the incoming flow label in the header with the outgoing flow label stored in a flow switching table stored at the router and indexed by the incoming flow label and the MAC address of the neighbors of the router. In this mode of operation, the difference between the present scheme and earlier ones stems from the way in which routers can establish the label swapping state using source switching.

IV.3. Source Switching

The source switching mode is unique to the present scheme. In source switching mode, the router that originates the packet first obtains the source route to the intended destination in terms of the LLIDs assigned to the links along the path from source to destination. As earlier established, the router obtains this information either through the routing protocol used in combination with this routing scheme, or by means of control search packets disseminated in the network.

Once a router has a source route based on LLIDs to the intended destination, it forwards a packet specifying the source-switching mode (ROC=3) to the next-hop router along the source route to the destination. The header of such a packet also contains the XLID assigned by the router to the link with the next hop of the source route, the router's own MAC address, the source route to the destination specified as a sequence of XLIDs, and a pointer into the source route informing its neighbor which is the next hop that the neighbor should examine. If receiver-assigned LLIDs are used, the header also contains the RLID assigned by the intended receiver to the link with the router sending the packet.

A packet is source switched at every hop by reading the source route in the packet header and substituting the XLID, and if present the RLID, specified in the header to allow the router to accept the packet with the XLID, and RLID if present, needed by the next hop.

Note that although LLIDs are swapped at each router, the labels used in source switching are very different than those used in the label switching approaches of the past, because they refer to the links over which the packet must flow, rather than the destination, or association from source to destination, for which the packet is intended.

Another approach to source switching would consist of specifying the MAC address of the next hop in the source route along with the source route specified in terms of LLIDs. Such a variation of the source switching approach could be used when channel bandwidth is not at a premium. The packet header in this forwarding mode would specify the source route field and would substitute the XLID field 48 for the RADD field 46. A router can then accept a packet based on the MAC address of the intended receiver specified in the header. However, given that LLIDs have to be used to provide a simple index to the SST, there may be little or no advantage to using the MAC address of the receiver rather than the LLID of the link to the same router.

IV.3.*a*. Source Switching Using Receiver- and Transmitter-assigned LLIDs

The switching operation at a router when receiver-assigned LLIDs are used in packet headers consists of accepting the packet and forwarding the packet, if accepted. The following pseudo-code specifies the procedure formally, which operations can be implemented in hardware or software.

First, the router decides whether to accept the packet or not based on the XADD, XLID, and RLID fields, 44, 48 and 50, of the packet header, which must match with one entry in the NIT 62 of the router. The XADD and XLID identify the link from neighbor to router; however, to permit the router receiving the packet to scan its NIT 62 using a simple index, the RLID given to the link from the router to the neighbor is also included in the packet. Accordingly, the router can scan its NIT 62 using the received RLID as the key, and decide whether or not to accept the packet by matching the XADD and XLID from the packet with the MAC address and LLID stored in its NIT 62.

If the packet is accepted, the router scans its SST 64 based on the XLID of the packet. To forward the packet to the next hop, it advances the PNH of the source route field 54 of the packet, and substitutes the XLID and RLID received with those expected by the next hop. The packet is then forwarded according to the link-level information for the next hop maintained in the SST 64.

The key advantage of this approach to source switching is that the look up in the NIT 62 is based on a simple key, and the added overhead of including the receiver-assigned LLID of a link (RLID) is minimal, because a router has a relatively small number of neighbors, which means that the lengths of the XLID and RLID fields 48 and 50 are small.

| | |
|---|---|
| SR: | Source route specified in packet header. |
| NIT: | Neighbor identification table. |
| SST: | Source switching table. |
| XLID: | Transmitter-assigned link identifier specified in packet header. |
| RLID: | Receiver-assigned link identifier specified in packet header. |

-continued

| | |
|---|---|
| XADD: | Transmitter's MAC address specified in packet header. |
| NIT.rlid: | Any LLID in NIT assigned by router to a link with a neighbor. |
| NIT(RLID): | Row of the NIT specified by RLID. |
| NIT(RLID).mac: | MAC address stored in NIT entry specified by RLID value. |
| NIT(RLID).xlid: | LLID assigned by neighbor to link with router and stored in NIT entry specified by RLID value. |
| PNH(SR): | Local link identifier specified by the pointer to the next hop (PNH) in packet header. |
| SST.xlid: | Any local link identifier in SST assigned to an outgoing link. |
| SST(XLID).rlid: | LLID assigned by neighbor to its link with router and stored in SST entry specified by XLID value. |

Procedure Source_Switching
{called when packet with ROC=3 is received}

1. If (XADD!=NIT(RLID).mac or XLID!=NIT(RLID).xlid) then reject packet and return
2. If (PNH(SR)!=SST.xlid) then reject packet and return
3. XLID<-PNH(SR)
4. RLID<-SST(XLID).rlid
5. PNH<-PNH+1
6. Forward packet according to forwarding instructions for SST(XLID)

End Source_Switching

IV.3.*b*. Source Switching Using Transmitter-Assigned Local Link Identifiers

A router receiving a packet specifying source switching may process the packet using the simple procedure specified in pseudo-code below. First, the router decides whether to accept the packet or not based on the XADD and XLID fields, 44 and 48, of the packet header, which must match with one array entry 68 in its NIT 62. The XLID and XADD uniquely identify a receiver router, because MAC addresses are unique and no router assigns the same XLID to more than one neighbor. Furthermore, searching the NIT 62 for a match between the packet's XLID and a LLID assigned to the router by one of its neighbors is very fast, because the router can have no more LLIDs assigned to it than the neighbors it has, and given a match with the packet's XLID searching for a match between the packet's XADD and the MAC addresses of the neighbors that assigned the same LLID to the router is very fast, because only a subset of the router's neighbors can use the same LLID for their links to the router.

If the packet is accepted, the router scans its SST 64 based on the XLID of the packet. To forward the packet, the router substitutes the XLID with the LLID corresponding to the PNH value of the source route and increments the PNH of the packet header. The packet is then forwarded according to the link-level information maintained in the SST 64 for the next hop in the route. The following pseudo-code formally specifies this simple procedure.

| | |
|---|---|
| SR: | Source route specified in packet header. |
| PNH(SR): | Local link identifier specified by the pointer to the next hop (PNH) in packet header. |
| NIT: | Neighbor identification table. |
| SST: | Source switching table. |
| XLID: | Transmitter-assigned link identifier specified in packet header. |
| XADD: | Transmitter's MAC address specified in packet header. |

-continued

| | |
|---|---|
| NIT.xlid: | Any LLID in NIT assigned by a neighbor to the link with the router. |
| NIT(XLID): | Row of the NIT specified by XLID. |
| SST(XLID): | Row of the SST specified by XLID. |
| NIT(XLID).mac: | Any MAC address in the row of the NIT specified by XLID. |
| SST.xlid: | Any local link identifier in SST assigned to an outgoing link. |

Procedure Source_Switching
{called when packet with ROC=3 is received}
1. If (XLID!=NIT.xlid) then reject packet and return
2. NIT(x)<-1
3. found<-false
4. While not (found) do
   found<-NIT(x).mac and XADD
   NIT(x)<-NIT(x)+1
5. If (not found) then reject packet and return
6. If (PNH(SR)!=SST.xlid) then reject packet and return
7. XLID<-PNH(SR)
8. PNH<-PNH+1
9. Forward packet according to forwarding instructions for SST(XLID)
End Source_Switching The above procedure can also be implemented in hardware or software.

IV.4. Flow Switching

The flow switching mode is unique to the present scheme and provides for packet switching using label swapping without the need to specify the MAC address of the receiver of the packet. This is accomplished by using the same approach used for source switching to determine when a packet should be accepted. If a match is found in the NIT 62 for the tuple formed by the XLID and XADD of the packet, or for the tuple formed by RLID, XLID, and XADD, if receiver-assigned LLIDs are used, the NIT 62 provides a pointer to the flow switching table (FST) 66 maintained for the neighbor that sent the packet.

The FST 66 maintains the mapping between the flow label specified in the packet and the flow label to be used for the next hop, together with the LLID of the link to the next hop and any outgoing link-level information. If RLIDs are used in packet headers, the FST 66 also specifies the RLID to be included in the header of the outgoing packet.

To forward a received packet, the subject router substitutes in the outgoing packet the values of either FL and XLID, or FL, XLID, and RLID in the header of the received packet with the entries specified in the FST 66 for the next hop of the packet. The following pseudo-code specifies the procedure used for flow switching when RLIDs are included in packet headers.

NIT: Neighbor Identification Table

| | |
|---|---|
| FST_p: | The flow switching table specified by the pointer p. |
| XLID: | Transmitter-assigned link identifier specified in packet header. |
| RLID: | receiver-assigned link identifier specified in packet header. |
| FL: | Flow label specified in packet header. |

-continued

| | |
|---|---|
| FST_p(IFL): | Forwarding instruction in FST_p for incoming flow label specified by IFL. |
| FST_p.ifl: | Any incoming flow label in FST_p. |
| FST_p(FL).ofl: | Outgoing flow label in the entry for incoming flow label FL in FST_p. |
| FST_p(FL).xlid: | LLID assigned by router to link with neighbor and stored in FST_p entry specified by FL. |
| FST_p(FL).rlid: | LLID assigned by neighbor to link with router and stored in FST_p entry specified by FL. |
| NIT(RLID).mac: | MAC address stored in NIT entry specified by RLID. |
| NIT(RLID).xlid: | LLID assigned by neighbor to link with the router in NIT entry specified by RLID. |
| NIT(RLID).ptr: | Pointer to an FST in NIT entry specified by RLID. |

Procedure Flow_Switching
{called when packet with ROC=4 is received}
1. If (XADD!=NIT(RLID).mac or XLID!=NIT(RLID).xlid) then reject packet and return
2. p<-NIT(RLID).ptr
3. If (FL!=FST_p.ifl) then reject packet and return
4. IFL<-FL
5. XLID<-FST_p(FL).xlid
6. RLID<-FST_p(FL).rlid
7. FL<-FST_p(FL).ofl
8. Forward packet according to forwarding instructions for FST_p(IFL)
End Flow_Switching The following pseudo-code specifies the procedure used for flow switching when no RLIDs are used in packet headers.

| | |
|---|---|
| NIT: | Neighbor identification table. |
| FST_p: | The flow switching table specified by the pointer p. |
| XLID: | Transmitter-assigned link identifier specified in packet header. |
| FL: | Flow label specified in packet header. |
| XADD: | Transmitter's MAC address specified in packet header. |
| NIT.xlid: | Any LLID in NIT assigned by a neighbor to the link with the router. |
| NIT(XLID): | Row of the NIT specified by XLID. |
| NIT(XLID).mac: | Any MAC address in the row of the NIT specified by XLID. |
| FST_p.ifl: | Any incoming flow label in FST_p. |
| FST_p(FL).ofl: | Outgoing flow label in the entry for incoming flow label FL in FST_p. |
| FST_p(FL).xlid: | LLID in the entry for incoming flow label FL in FST_p. |
| NIT(XLID,XADD).ptr: | Pointer to an FST for neighbor with MAC address that matches XADD in NIT entry specified by XLID. |

Procedure Flow_Switching
{called when packet with ROC=4 is received}
1. If (XLID!=NIT.xlid) then reject packet and return
2. NIT(x)<-1
3. found<-false
4. While not (found) do
   found<-NIT(x).mac and XADD
   NIT(x)<-NIT(x)+1
5. If (not found) then reject packet and return
6. p<-NIT(XLID,XADD).ptr
7. If (FL!=FST_p.ifl) then reject packet and return 8. FL<-FL
9. XLID<-FST_p(FL).xlid
10. FL<-FST_p(FL).ofl
11. Forward packet according to forwarding instructions for FST(IFL)
End Flow_Switching IV.5. Incremental Switching With incremental switching, a packet is accepted by a router based on the XADD, XLID, and RLID specified in the header using the same approach described for source switching. The accepted packet is then passed to a higher layer for further processing, which may include routing at the network layer.

V. Establishing Flow State at Routers

In the present scheme, flow state may be established either incrementally or using source routes, and establishing flow state amounts to another packet forwarding mode, i.e., flow state is established by forwarding data packets. A router that decides to establish flow state along a loop-free path to a destination first obtains the source route to the destination in the same way as in source switching mode. Once the router obtains a source route, it sends a source-switched data packet with flow setup instructions, so that flow state can be set as the packet traverses the source route to the destination. The header of the packet specifies: the source-switched flow establishment operation code (ROC=5), the MAC address of the transmitting router (XADD), the XLID of the link to the next hop, a flow label (FL), and the source route field 54.

When a router receives a packet with the source-switched flow establishment operation code, it establishes flow state and forwards the packet according to source switching. The router determines whether to accept the packet or not based on the XADD, XLID, and RLID fields, 44, 48 and 50, of the header, or the XADD an XLID fields, 44 and 48, only, if no RLIDs are used to implement source switching and flow switching. If the packet is accepted, the receiving router establishes an entry in the FST 66 for its neighbor; in such an entry the FL received in the packet is mapped into an outgoing flow label created by the router and the XLID and, if applicable, the RLID of the next hop in the source route specified in the packet. The router forwards the packet as in the case of source-switching mode, together with the swapping of flow labels.

The following pseudo-code describes the procedure used when RLIDs are used in packet headers in the present scheme.

| | |
|---|---|
| SR: | Source route specified in packet header. |
| NIT: | Neighbor identification table. |
| SST: | Source switching table. |
| XLID: | Transmitter-assigned link identifier specified in packet header. |
| RLID: | Receiver-assigned link identifier specified in packet header. |
| XADD: | Transmitter's MAC address specified in packet header. |
| NIT.rlid: | Any LLID in NIT assigned by router to a link with a neighbor. |
| NIT(RLID): | Row of the NIT specified by RLID. |
| SST(XLID): | Row of the SST specified by XLID. |
| NIT(RLID).mac: | MAC address stored in NIT entry specified by RLID value. |
| NIT(RLID).xlid: | LLID assigned by neighbor to link with router and stored in NIT entry specified by RLID value. |
| PNH(SR): | Local link identifier specified by the pointer to the next hop (PNH) in packet header. |
| SST.xlid: | Any local link identifier in SST assigned to an outgoing link. |
| SST(XLID).rlid: | LLID assigned by neighbor to its link with router and stored in SST entry specified by XLID value. |

Procedure Source_Switched_Flow
{called when packet with ROC=3 is received}
1. If (XADD!=NIT(RLID).mac or XLID NIT(RLID).xlid) then reject packet and return
2. If (PNH(SR)!=SST.xlid) then reject packet and return
3. p<-NIT(RLID).ptr
4. Create new entry in FST_p for FL
5. XLID<-PNH(SR)
6. RLID<-SST(XLID).rlid
7. PNH<-PNH+1
8. Forward packet according to forwarding instructions for SST(XLID)
End Source_Switched_Flow The following pseudo-code specifies the procedure used to establish flow state with source switching when RLIDs are not used in packet headers.

| | |
|---|---|
| SR: | Source route specified in packet header. |
| PNH(SR): | Local link identifier specified by the pointer to the next hop (PNH) in packet header. |
| NIT: | Neighbor identification table. |
| SST: | Source switching table. |
| XLID: | Transmitter-assigned link identifier specified in packet header. |
| XADD: | Transmitter's MAC address specified in packet header. |
| FL: | Flow label specified in packet header. |
| NIT(XLID): | Row of the NIT specified by XLID. |
| NIT(XLID).mac: | Any MAC address in the row of the NIT specified by XLID. |
| SST.xlid: | Any local link identifier in SST assigned to an outgoing link. |
| NIT(XLID,XADD).ptr: | Pointer to an FST for neighbor with MAC address that matches XADD in NIT row given by XLID. |
| FST_p(FL).ofl: | Outgoing flow label in the entry for incoming flow label FL in FST_p. |
| FST_p(FL).xlid: | LLID in the entry for incoming flow label FL in FST_p. |

Procedure Source_Switched_Flow
{called when packet with ROC=5 is received}
1. If (XLID!=NIT.xlid) then reject packet and return
2. NIT(x)<-1
3. found<-false
4. While not (found) do
   found<-NIT(x).mac and XADD
   NIT(X)<-NIT(x)+1
5. If (not found) then reject packet and return
6. If (PNH(SR)!=SST.xlid) then reject packet and return
7. p<-NIT(XLID,XADD).ptr
8. Create new entry in FST_p for FL
   8.a. FST_p(FL).ofl<-new ofl for FST_p
   8.b. FST_p(FL).xlid<-PNH(SR)
9. XLID<-PNH(SR)

10. PNH<-PNH+1
11. FL<-FST_p(FL).ofl
12. Forward packet according to forwarding instructions for SST(XLID)
End Source_Switched_Flow If the present scheme is used in combination with a routing protocol, flow state can also be established incrementally. In this case, the router obtains the next hop to a destination from its routing table and forwards a data packet with the following control information in its header: the ROC=6, the MAC address of the router (XADD), the XLID of the link to the next hop, a flow label (FL), and the path-traversed field 56. The path-traversed field 56 specifies the path traversed by the packet from its origin to the present hop in terms of the MAC addresses of each hop visited by the packet.

A router that receives the packet with ROC=6 accepts it based on the XLID, XADD tuple. The router then determines if the packet has visited the router before and, if so, discards the packet. If no such loop is detected, the router then consults its routing table and obtains the LLID for the link to its next hop to the intended destination. Note that the address of the destination is specified in the payload of the packet, not in its header. Once the next hop and the LLID for the next hop are obtained, the router installs the mapping between the FL (incoming flow label) of the received packet and a new outgoing flow label and the LLID for the next hop towards the destination (obtained from its routing table). The router then substitutes FL with its outgoing flow label for the destination, adds its MAC address to the path-traversed field 56, and sends the packet to the next hop. Thus, although such an approach is viable, the preferred approach to flow setup is source-routed flow setup, because it incurs much less communication and processing overhead.

Thus, a scheme for routing and switching in computer networks has been described. Although discussed with reference to certain illustrated embodiments, however, the more general applicability of the following claims should not be limited thereby.

What is claimed is:

1. A method comprising:
   receiving a packet at a first router of a data network;
   forwarding the packet to a second router of the data network according to one of a plurality of forwarding modes specified by a routing operation code in the header of the packet, wherein the plurality of modes comprise (1) modes wherein the packet is accepted based on a receiving node address included in the header and (2) source switching, flow switching, and incremental modes wherein the packet is accepted based at least in part on a local link identifier included in the header.

2. The method of claim 1, wherein the plurality of modes further comprise a broadcast mode wherein packets transmitted by the first router are accepted by all neighboring routers of the first router.

3. The method of claim 1, wherein the modes wherein a packet is accepted based on a receiving node address included in the header comprise a label swapping mode and a hop-by-hop mode wherein the packet is accepted based on the receiving node address included in the header.

4. The method of claim 1, wherein a value of the routing operation code determines certain types of other information included in the header of the packet.

5. The method of claim 4, wherein a sending node address is included in the header of the packet regardless of which of plurality of modes is specified by the routing operation code.

6. The method of claim 5, wherein the sending node address comprises a medium access code address of the sending node.

7. The method of claim 4, wherein the receiving node address comprises a medium access code address of the receiving node.

8. The method of claim 2, wherein the header of the packet includes a receiving node-assigned local link identifier if the routing operation code specifies one of the source switching or flow switching modes.

9. The method of claim 1, wherein the header of the packet includes a flow label if the routing operation code specifies the flow switching mode.

10. The method of claim 1, wherein the flow switching mode receiving routers are identified using local link identifiers associated with communication links between transmitting routers and intended receiving routers.

11. The method of claim 1, wherein in the flow switching mode, flow states at routers of the data network are established according to information in data packets transmitted within the data network.

12. The method of claim 11, wherein the information included in the data packets allows for bindings between incoming and outgoing flow labels to be established at each of the routers.

13. The method of claim 1, wherein the header of the packet includes a source route to an intended destination if the routing operation code specifies the source switching mode.

14. The method of claim 13, wherein the source route is specified in terms of local link identifiers used by routers in the data network.

15. The method of claim 13 wherein the source route is obtained by using either a flood search process or a routing protocol operative within the data network.

16. The method of claim 1, wherein forwarding the packet comprises:
   reading in the header of the packet at the first router a routing operation code that specifies the source switching mode;
   reading in the header of the packet at the first router a source route;
   replacing a first transmitting router local link identifier in the header of the packet at the first router with a second transmitting router local link identifier needed by the second router.

17. The method of claim 1, wherein forwarding the packet comprises:
   reading in the header of the packet at the first router a routing operation code that specifies the source switching mode;
   reading in the header of the packet at the first router a source route;
   replacing a first transmitting router local link identifier and a first receiving router local link identifier in the header of the packet at the first router with a second transmitting router local link identifier and a second receiving router local link identifier needed by the second router.

18. The method of claim 1, wherein forwarding the packet comprises:
   reading in the header of the packet at the first router a routing operation code that specifies the flow switching mode;
   reading in the header of the packet at the first router a source route;

replacing a first flow label in the header of the packet at the first router with a second flow label needed by the second router.

19. The method of claim 1, wherein the packet comprises a data packet that includes flow setup instructions for a next receiving node.

20. The method of claim 1, wherein the header of the packet includes a path-traversed field.

21. The method of claim 3, wherein forwarding the packet comprises:
reading in the header of the packet at the first router a routing operation code that specifies the label swapping mode;
replacing a first flow label in the header of the packet at the first router with a second flow label by indexing a flow switching table stored at the first router.

22. A packet for use in a data network, comprising:
a header that includes a routing operation code that specifies one of a plurality of modes for forwarding the packet within the data network, wherein the plurality of modes comprise (1) modes wherein a packet is accepted based on a receiving node address included in the header and (2) source switching, flow switching, and incremental modes wherein a packet is accepted based at least in part on a local link identifier included in the header and not on a receiving node address; and,
a payload.

23. The packet of claim 22, wherein the plurality of modes further comprise a broadcast mode.

24. The packet of claim 22, wherein the modes wherein a packet is accepted based on a receiving node address included in the header comprise a label swapping mode and a hop-by-hop mode wherein the packet is accepted based on the receiving node address included in the header.

25. The packet of claim 22, wherein the header further includes a sending node address regardless of which of the plurality of modes is specified by the routing operation code.

26. The packet of claim 25, wherein the sending node address comprises a medium access code address of the sending node.

27. The packet of claim 22, wherein the receiving node address comprises a medium access code address of the receiving node.

28. The packet of claim 22, wherein the header includes a transmitting node-assigned local link identifier if the routing operation code specifies one of the source switching, flow switching, or incremental modes.

29. The packet of claim 22, wherein the header includes a receiving node—assigned local link identifier if the routing operation code specifies one of the source switching or flow switching modes.

30. The packet of claim 22, wherein the header includes both a transmitting node-assigned local link identifier and a receiving node-assigned local link identifier if the routing operation code specifies one of the source switching, flow switching, or incremented modes.

31. The packet of claim 22, wherein the header includes a flow label if the routing operation code specifies the flow switching mode.

32. The packet of claim 22, wherein the packet includes a source route to an intended destination if the routing operation code specifies the source switching mode.

33. The packet of claim 22, wherein the header includes a path-traversed field.

34. The packet of claim 33, wherein the path-traversed field comprises (1) a hop count specifying a total number of routers visited by the packet and (2) an ordered sequence of medium access control addresses of routers visited by the packet.

35. The packet of claim 22, wherein the header includes a payload-type field that specifies the type of payload that follows the header.

36. The packet of claim 22, wherein the header includes a time to live field.

37. The packet of claim 36, wherein the header further includes a version field that specifies a version of a protocol used to process the packet.

38. The packet of claim 37, wherein the header further includes (1) a reliability field that specifies a degree of reliability with which the packet must be successfully forwarded by a router and (2) a priority field that specifies a priority that the packet should be assigned in a transmission queue of a router.

39. The packet of claim 22, wherein the routing operation code determines which of a plurality of fields of information are included in the header of the packet, wherein the plurality of fields of information comprise (1) address information of a receiving router, (2) local link identifier information assigned by a transmitting router, (3) local link identifier information assigned by a receiving router, (4) a flow label, (5) a source route, (6) a path traversed, and (7) a payload type.

40. A router comprising:
a neighbor identification table configured to allow the router to determine whether a received packet should be accepted and, if so, which of a plurality of switching tables to access to retrieve information for forwarding the packet within a data network;
a source switching table of the plurality of switching tables, wherein the source switching table is configured to provide packet forwarding information which the router is to use to forward the packet using a source switching process;
a flow switching table of the plurality of switching tables, wherein the flow switching table is configured to provide packet forwarding information when the router is to forward the packet using a flow switching process, wherein the flow switching table specifies mappings from incoming flows to outgoing flows, local link identifiers for next hops, and associated link-level information.

41. The router of claim 40, wherein the neighbor identification table is arranged so as to be indexed using local link identifiers assigned by neighboring routers to links communicatively coupling the router thereto.

42. The router of claim 40, wherein the neighbor identification table is further arranged to provide pointers to the source switching table and the flow switching table.

43. The router of claim 40, wherein the neighbor identification table is arranged so as to be indexed using local link identifiers assigned by the router to links to neighboring routers.

44. The router of claim 40, wherein the source switching table is arranged so as to be indexed according to local link identifiers assigned by neighboring routers to links communicatively coupling the router thereto.

45. A router of a data network, comprising:
means for receiving a packet; and,
means for forwarding the packet to another router of the data network according to one of a plurality of forwarding modes specified by a routing operation code in the header of the packet, wherein the plurality of modes comprise (1) modes wherein the packet is accepted based on a receiving node address included in the header and (2) source switching, flow switching, and incremental modes wherein the packet is accepted based at least in part on a local link identifier included in the header.

46. The router of claim 45, wherein the plurality of modes further comprise a broadcast mode.

47. The router of claim 45, wherein the modes wherein a packet is accepted based on a receiving node address included in the header comprise a label swapping mode and a hop-by-hop mode wherein the packet is accepted based on the receiving node address included in the header.

48. The router of claim 45, wherein a value of the routing operation code determines certain types of other information included in the header of the packet.

49. The router of claim 45, wherein the means for forwarding the packet comprise:

means for reading in the header of the packet a routing operation code that specifies the source switching mode;
  means for specifying an outgoing interface and link-level information for transmitting the packet to a next hop.

50. The router of claim 45, wherein the means for forwarding the packet comprise:

means for reading in the header of the packet a routing operation code the specifies the flow switching mode;
  means for mapping an incoming flow label to an outgoing flow label;
  means for identifying a next hop;
  means for specifying necessary link-level information for transmitting the packet to the next hop.

* * * * *